Aug. 15, 1950  J. L. DOLE  2,519,235
DRINK DISPENSING DEVICE

Filed Dec. 24, 1942  2 Sheets-Sheet 1

Inventor
John L. Dole
by Parker & Carter
Attorneys

Aug. 15, 1950   J. L. DOLE   2,519,235
DRINK DISPENSING DEVICE
Filed Dec. 24, 1942   2 Sheets-Sheet 2
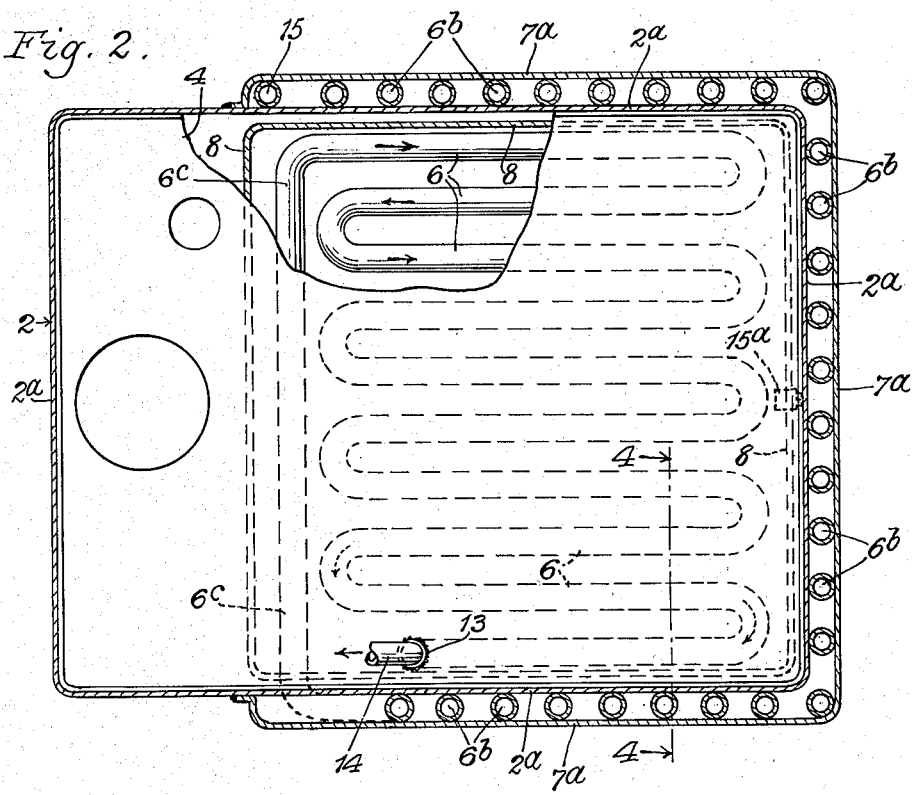
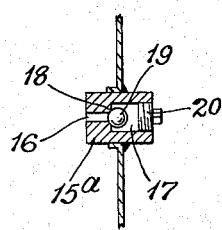
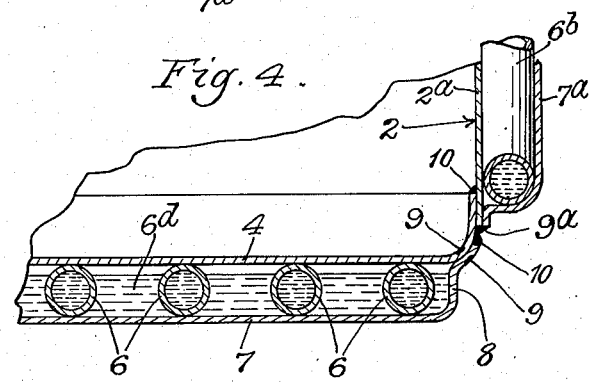
Inventor
John L. Dole
by Parker & Carter
Attorneys.

Patented Aug. 15, 1950

2,519,235

UNITED STATES PATENT OFFICE 2,519,235

DRINK DISPENSING DEVICE

John L. Dole, Wayne, Ill., assignor to The Dole Valve Company, Chicago, Ill., a corporation of Illinois Application December 24, 1942, Serial No. 470,058

2 Claims. (Cl. 225—40)

This invention relates to drink dispensing devices and has for its object to provide a new and improved device of this description.

The invention has as a further object to provide a drink dispensing device where carbonated water is mixed with a syrup to form a drink and wherein the cooling of the carbonated water is performed in a separate chamber from that in which the syrup receptacle is cooled.

The invention has as a further object to provide a drink dispensing device wherein carbonated water is mixed with a syrup, having an outer casing and an inner cooling casing with heat insulation between them and an intermediate chamber between the bottom of the cooling casing and the insulating material and in which the carbonated water is cooled.

The invention has as a further object to provide a drink dispensing device wherein carbonated water is mixed with a syrup and wherein there is an outer casing and an inner cooling casing with a cooling coil for cooling the carbonated water located on the exterior of the cooling casing so that the cooling casing is free from coils, and can, therefore, be easily cleaned.

The invention has as a further object to provide a drink dispensing device wherein carbonated water is mixed with a syrup and in which the carbonated water is cooled in a coil in a separate chamber from which air has been withdrawn so that the pressure in the chamber is less than that outside of the chamber.

The invention has a further object to provide a device of this description in which one wall of the chamber containing the coil for the carbonated water also forms one wall of the cooling casing.

The invention has further objects which are more particularly pointed out in the accompanying description.

Referring now to the drawings, Fig. 1 is a side view with parts broken away, showing one form of the invention;

Fig. 2 is a sectional view through the inner cooling casing, with parts omitted, showing the preferred arrangement of the coil through which the carbonated water is delivered to the nozzle;

Fig. 3 is a view showing the plug used to exhaust air from the cooling chamber;

Fig. 4 is a sectional view taken on line 4—4 of Fig. 2.

Like numerals refer to like parts throughout the several figures.

Figure 1:
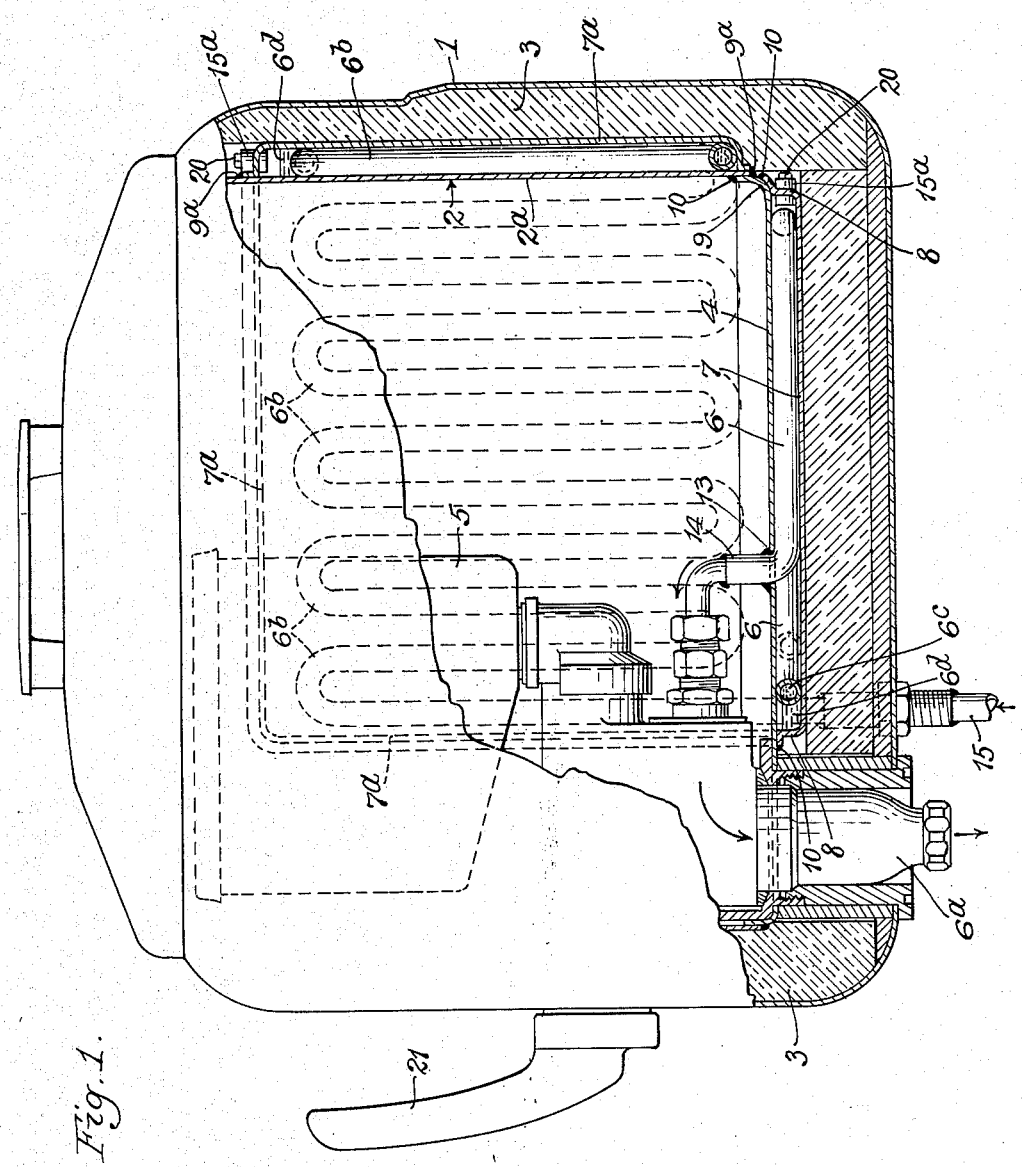

The present invention may be used in connection with any suitable dispensing device, such, for example, as that shown in the Lund application Serial Number 406,747, filed August 14, 1941, now Patent No. 2,349,441, issued May 23, 1944.

As shown in the drawings, the device comprises an outer casing 1 and an inner cooling casing 2, the two being spaced apart. The space between the outer casing and the inner cooling casing contains heat insulating material 3. The cooling casing has a bottom 4 which is smooth. There is a syrup jar 5 in this cooling casing. In use, the cooling casing contains some cooling material such as ice, which cools the syrup jar and the syrup therein.

There is a coil 6 through which the carbonated water passes from the source of carbonated water to the discharge point, namely the nozzle 6a of the device.

Means is provided for cooling the carbonated water in this coil by means of the inner cooling casing 2 without having the coil located in this casing as has been the practice heretofore. This result is secured by having the coil 6 located in a separate chamber from that in which the cooling material is placed, one wall of this separate chamber being a wall of the inner cooling casing. This cooling coil 6 may be located at any point desired, such as below the bottom 4 of the cooling casing or around the exterior vertical face of the cooling casing.

In order to insure a sufficient length of the coil to properly cool the carbonated water when the drink is withdrawn rapidly, I prefer to have this coil with a portion located on the exterior of the bottom of the casing 2 and a portion located along one or more of the exterior vertical walls of the casing 2. I have shown the coil 6 as extending along the bottom and along the three vertical sides of the casing 2. The portion of the coil 6 at the bottom is enclosed in a chamber formed by the bottom 4 of the cooling casing and a plate 7 located below the bottom of the cooling casing and the coil 6. The bottom 4 has two functions, one to form the bottom of the cooling casing and the other to form the wall of the chamber containing the coil 6. The plate 7 has upturned edges 8 which are connected with the cooling casing 2, the connection being such as to provide a hermetically sealed chamber for the bottom portion of the coil 6. The sealing connection for the plate 7 and the bottom 4 may be provided in any desired manner as by welding or soldering, or otherwise. I have shown the welding 9 and the soldering 10.

The vertically arranged portions 6b of the coil are located between the vertical walls 2a of the casing 2 and a plate 7a which has its edges turned inwardly and attached to the walls 2a so as to form a hermetically sealed chamber for this portion of the coil. This attachment may be made in any desired manner as by welding or soldering 9a, as shown in connection with the plate 7 and the bottom 4.

The bottom 4 is provided with an opening through which the discharge end 14 of the coil 6 passes. This opening is hermetically sealed in any desired manner as by welding or soldering 13.

The carbonated water enters the coil 6b at 15 and passes back and forth through the coil 6b and then passes through pipe 6c to the end of coil 6, thence through coil 6, out through the discharge end 14 of the coil 6 and thence to the discharge nozzle 6a.

Some means is provided for exhausting air from the chambers containing the coils 6 and 6b so that the pressure on the interior of the chambers is less than that on the exterior thereof so that the atmospheric pressure presses the walls of the chamber into intimate heat exchange contact with the coils 6 and 6b through which the carbonated water passes. One means for exhausting the air is illustrated in detail in Fig. 3 and consists of a plug 15a which passes through an opening in one of the walls of the coil containing chamber or chambers. The opening for the plug 15a is hermetically sealed in any desired manner, as by welding. This plug has a passageway therethrough consisting of the section 16 and the section 17 of greater cross-sectional area than the section 16. The two sections are separated by the shoulder 18 which acts as a seat for the ball valve 19. There is a closure 20 which has a screw threaded connection with the interior of the section 17.

In addition to having the air exhausted from the chambers containing the coils 6 and 6b, I prefer to partially fill these chambers with an eutectic 6d. This eutectic only partially fills the chambers, leaving a portion unfilled with eutectic and the air is withdrawn from this unfilled portion. This greatly increases the efficiency of the cooling effect of the cooling material on the carbonated water in the coils 6 and 6b. When the eutectic is inserted, the ball valve 19 is removed and the plug 15a connected with a source of eutectic supply. The ball valve 19 is then replaced. When the air is being removed, the ball 19 is in position and the plug 15a is connected with some air withdrawing means. When a sufficient amount of air is withdrawn, the amount depending upon the conditions present, the ball valve 19 is forced onto its seat by the external air pressure so as to close the passageway 16. The closure 20 is then placed in position and sealed so as to maintain the low pressure in the interior of the chambers for the coils 6 and 6b.

The pipe forming the coils 6 and 6b may be bent or coiled, or arranged in any desired manner. I have simply attempted to show one means, for purpose of illustration. The illustrated arrangement of coil 6b in the lateral walls 2a with the runs alined vertically is particularly advantageous as a more uniform distribution of temperatures in the vertical walls 2a and in the cooling casing is thereby achieved. Since the temperature of the carbonated water in any given vertical run of coil 6b is approximately uniform, the heat transferred from the water will tend to establish a like uniformity in the temperature of the casing. The result of a more uniform temperature in the cooling casing is increased cooling of the syrup and of the carbonated water.

The use and operation of my invention are as follows:

An eutectic is placed in the chambers containing the coils 6 and 6b through which the carbonated water passes and air is withdrawn from these chambers to cause the walls thereof to tightly contact with the coils.

The syrup is placed in a syrup jar 5 and some cooling material, such as ice, placed in the inner cooling casing. The coil 6 is connected with a source of carbonated water.

When it is desired to draw a drink, the handle 21 is moved. This causes syrup from the syrup chamber to be discharged and also causes carbonated water from the coils 6 and 6b to be discharged, the two being discharged through the nozzle 6a into the drinking glass.

As the carbonated water passes through the coils 6 and 6b, it is cooled by the cooling material in the inner cooling casing 2.

When it is desired to clean the inner cooling casing, it will be seen that this can be easily and quickly done because the bottom thereof is smooth and the coils 6 and 6b are placed in a separate chamber and do not, therefore, interfere with the cleaning of the cooling casing.

I claim:

1. In a carbonated drink dispenser including an inner open-topped casing with a bottom wall and side walls defining an ice chamber, an outer casing surrounding the inner casing, insulation material between the casings, a carbonated water coil between the insulation and inner casing, a syrup jar supported in the inner casing, and a nozzle communicating with the jar and coil to dispense a syrup flavored cold drink, the improvements of said coil running back and forth across the outer faces of said side walls and the bottom of the inner casing, the runs of said coil on said side walls being substantially vertical, a first plate surrounding said side walls to overlie the adjacent coil and having turned up marginal edge portions connected to said wall in sealed engagement therewith, said plates and the adjacent walls defining sealed chambers, a plug secured in each plate defining a valve-seat equipped passage to each chamber, a check valve coacting with the seat in each passage to retain a vacuum in the chambers, and closure means for each plug to seal the passage, whereby said sealed chambers are adapted to receive a eutectic solution and to be evacuated for drawing the adjacent casing walls against the coil to insure good heat transfer from the coils to the ice chamber.

2. In a carbonated drink dispenser including an inner open-topped casing with a bottom wall and four side walls defining an ice chamber, an outer casing surrounding the inner casing, insulation material between the casings, a carbonated water coil between the insulation and inner casing, a syrup jar supported in the inner casing, and a nozzle communicating with the jar and coil to dispense a syrup flavored cold drink, the improvements of said coil running back and forth across the outer faces of three side walls and the bottom of the inner casing, the runs of said coil on said side walls being substantially vertical, a first plate surrounding said side walls to overlie the adjacent coil and having turned up marginal edge portions connected to said wall in sealed engagement therewith, said plates and the adjacent walls defining sealed chambers, a plug secured in each plate defining a passage to each chamber, and closure means for each plug to seal the passage, whereby said sealed chambers are adapted to receive a eutectic solution and to be evacuated for drawing the adjacent casing walls against the coil to insure good heat transfer from the coils to the ice chamber.

JOHN L. DOLE.

REFERENCES CITED

The following references are of record in the file of this patent:

UNITED STATES PATENTS

| Number | Name | Date |
| --- | --- | --- |
| 659,298 | Gratz | Oct. 9, 1900 |
| 691,786 | Levy | Jan. 28, 1902 |
| 2,121,841 | Tweed | June 28, 1938 |
| 2,217,702 | Kleist | Oct. 15, 1940 |
| 2,231,012 | Kleist | Feb. 11, 1941 |